May 21, 1929.    V. F. ESPENSCHIED    1,714,468
METAL SCREEN MAKING MACHINE
Filed April 25, 1927    7 Sheets-Sheet 2

INVENTOR.
VIRGIL F. ESPENSCHIED.
BY Ely & Barrow
ATTORNEYS.

May 21, 1929.　　V. F. ESPENSCHIED　　1,714,468
METAL SCREEN MAKING MACHINE
Filed April 25, 1927　　7 Sheets-Sheet 3

INVENTOR.
VIRGIL F. ESPENSCHIED.
BY
Ely Barrow
ATTORNEYS.

INVENTOR.
VIRGIL F. ESPENSCHIED.
BY Ely & Barrow
ATTORNEYS.

May 21, 1929.  V. F. ESPENSCHIED  1,714,468
METAL SCREEN MAKING MACHINE
Filed April 25, 1927   7 Sheets-Sheet 5
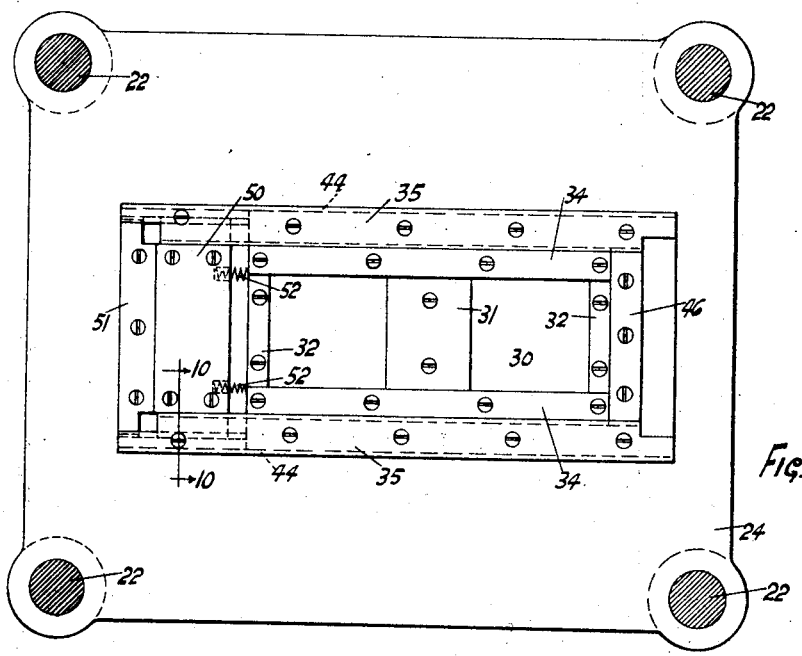
INVENTOR.
VIRGIL F. ESPENSCHIED.
BY Ely & Barrow
ATTORNEYS.

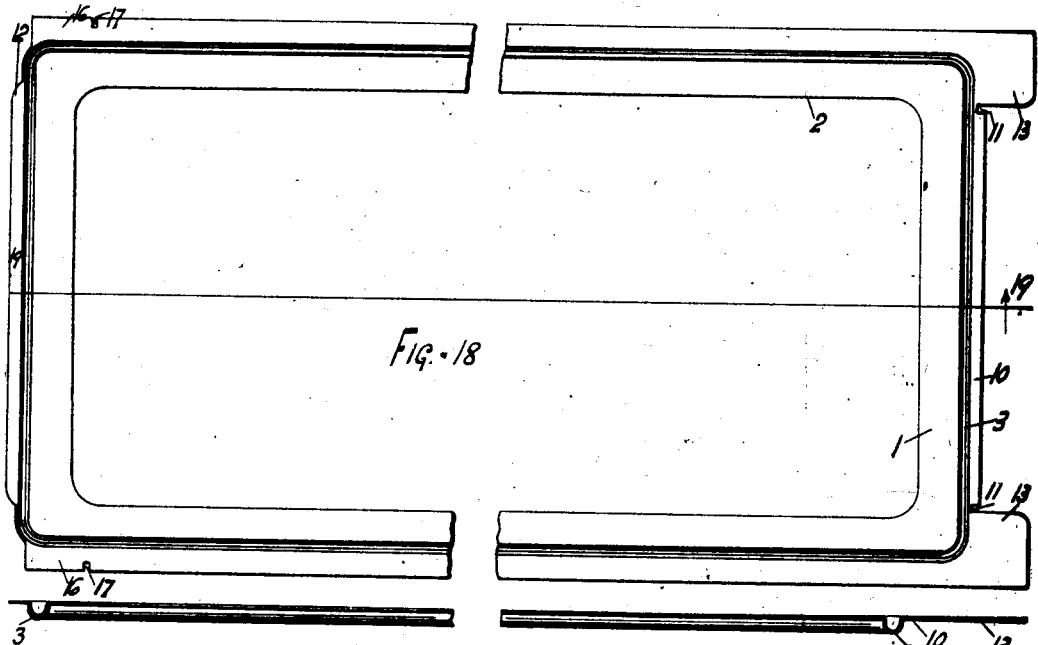
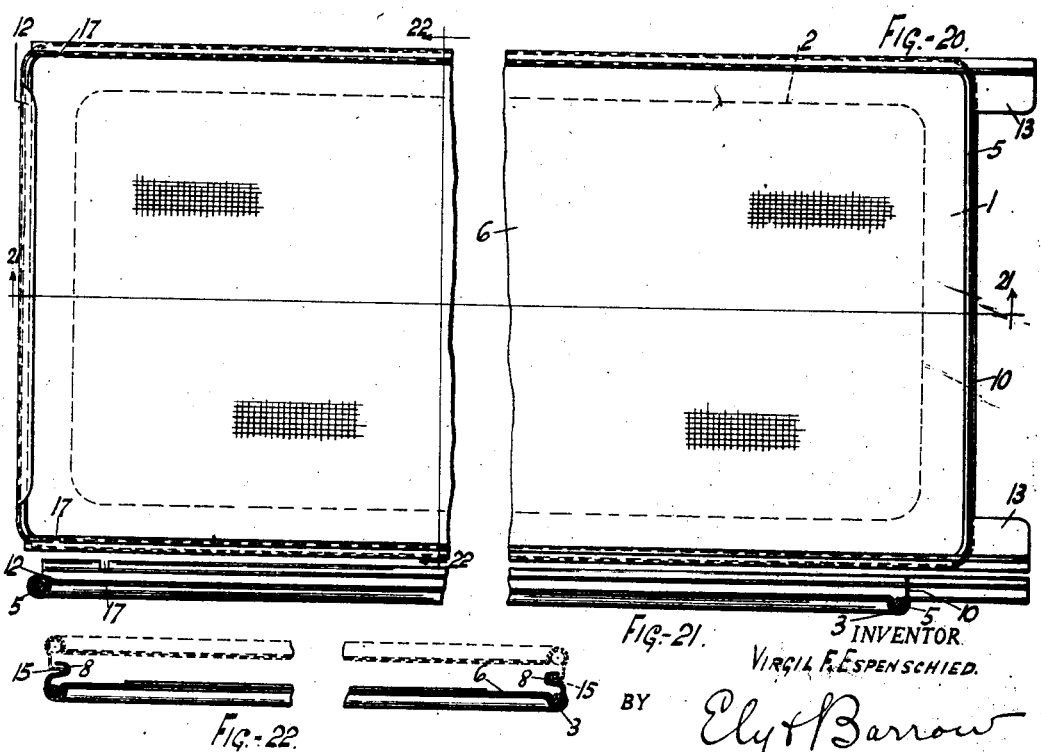

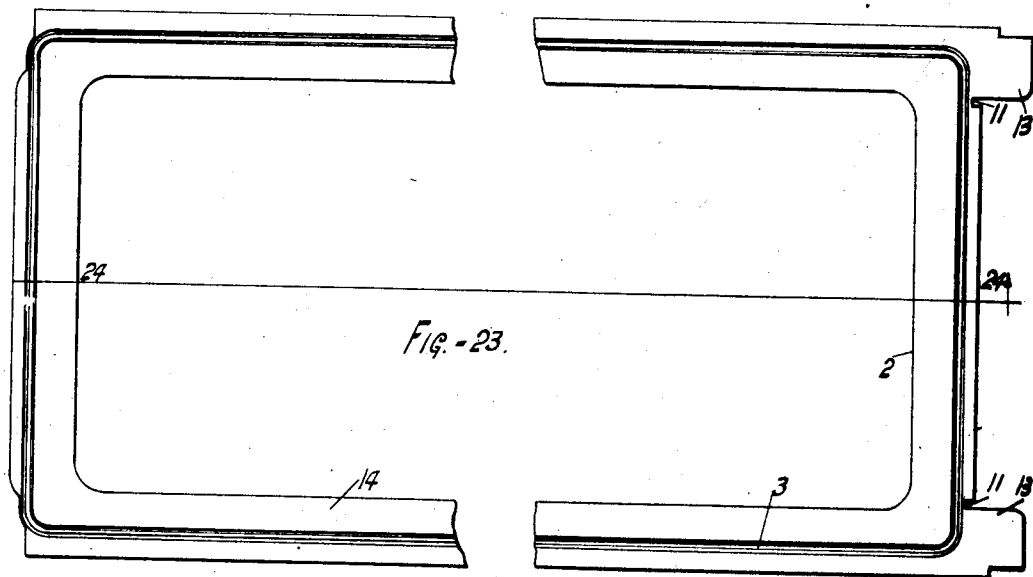
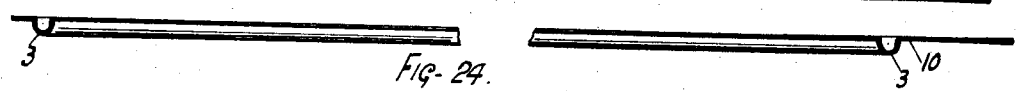
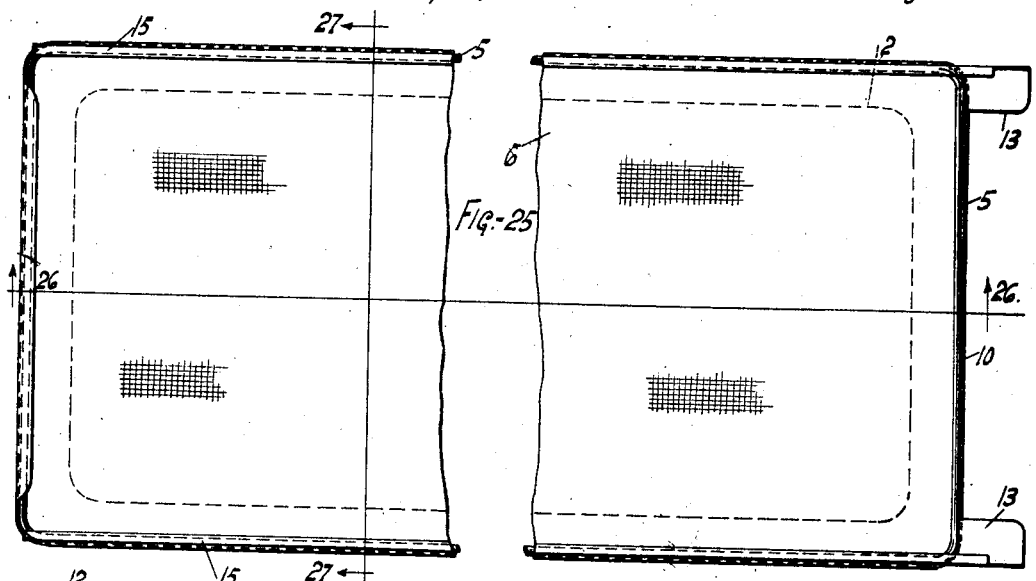
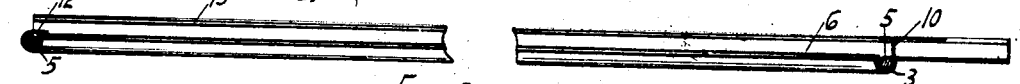

Patented May 21, 1929.

1,714,468

UNITED STATES PATENT OFFICE.

VIRGIL F. ESPENSCHIED, OF HARTVILLE, OHIO, ASSIGNOR OF ONE-HALF TO HOWARD F. SCHUMACHER AND ONE-HALF TO CARL E. SCHUMACHER, BOTH OF HARTVILLE, OHIO.

METAL-SCREEN-MAKING MACHINE.

Application filed April 25, 1927. Serial No. 186,468.

This invention relates to a new and improved apparatus for manufacturing metal screens, preferably of the sliding, adjustable type, the machine being designed to force the screen cloth retaining wires in position and secure them in the screen and at the same time to form the requisite flanges and gutters upon the screen which constitute the interlocking sliding formations.

The adjustable screen unit comprises two members, known herein as the male and the female members, the male member being provided with an inturned flange or tongue and the female member with a mating gutter which fit together to hold the screen in sliding relationship.

The advantages of the invention will be understood from the detailed description, the machine herein shown being the first which, at a single operation, will force the screen cloth retaining members in position and at the same time form the edges of the screen to clamp the retaining members and form the mating flanges and gutters. It is also an object of the invention to construct a machine which will make a screen member from a single sheet or stamping of metal. The machine takes the blank cut out from sheet metal and makes the complete one-piece screen member therefrom without manual operation.

While the description of the machine and the manner of its operation is given with considerable detail and in its preferred embodiment, so that the invention may be practised by those skilled in the art, it is possible that modifications or improvements may be made thereon, which fall within the scope of the invention as set forth in the claims forming a part hereof. The claims are intended to cover such changes, modifications or improvements as fairly fall within the meaning and intent thereof.

In the drawings:

Figure 7 is a view looking upwardly at the under side of the crosshead, the view being taken on the line 7—7 of Figure 1;

Figure 8 is an end view of the top plate at the right with a female screen member carried therein as it is formed at the end of the stamping operation;

Figure 9 is a similar view of the left hand end view of the top plate;

Figure 10 is an enlarged section on the line 10—10 of Figure 7;

Figure 14 is a view similar to Figure 12, taken at a midway point along the right hand side of the screen;

Figure 15 is a cross-section similar to Figure 13, taken at a midway point along the left hand side of the screen;

Figure 16 is a view showing the tools which form the female screen member;

Figure 17 is a view showing the tools which form the male screen member;

Figure 18 is a view showing the female blank;

Figure 19 is a section on the line 19—19 of Figure 18;

Figure 20 is the completed female screen member;

Figure 21 is a section on the line 21—21 of Figure 20;

Figure 22 is a section on the line 22—22 of Figure 20, showing the male screen member in dotted lines;

Figure 23 is a view showing the male blank;

Figure 24 is a section on the line 24—24 of Figure 23;

Figure 25 is a view showing the completed male screen member;

Figure 26 is a section on the line 26—26 of Figure 25; and

Figure 27 is a section on the line 27—27 of Figure 25.

Figure 1:
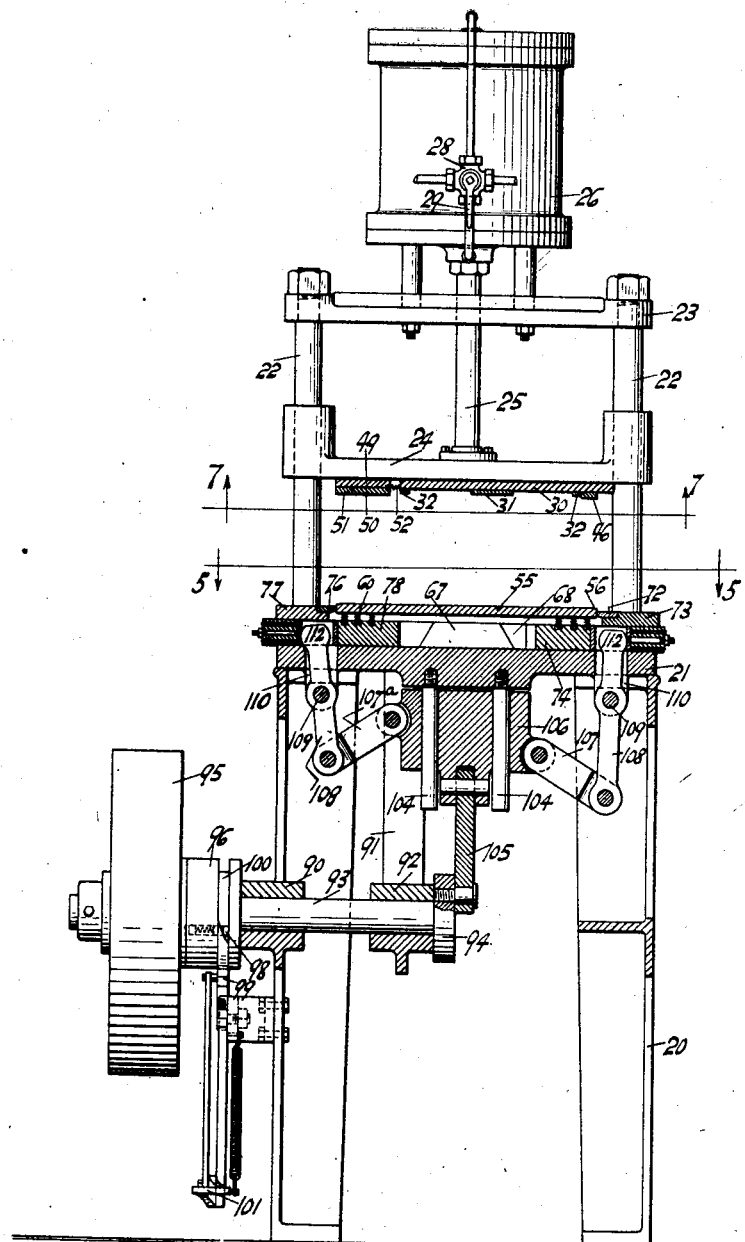
Figure 1 is a front elevation, partly in section, of the machine opened up or in non-operative position.

In order to make the various operations clear, the construction of the screen and the individual male and female members will first be described.

The female screen member illustrated in Figures 18 to 22 comprises a frame 1 stamped out of a single sheet of metal with a central opening 2. Near the edge of the screen blank is stamped a gutter 3 in which is held a wire binding and clamping rod or wire 5, serving to hold the screen fabric 6 in place, the forcing of the wire in position drawing the screen fabric tautly across the frame. After the wire 5 is forced into the gutter, the outer wall of the gutter is bent over the wire sufficiently to retain it within the gutter. The longitudinal edges of the blank, or those which constitute the upper and lower edges of the screen, are formed with outwardly offset U-shaped channels 8 which open outwardly of the screen. One end of the screen, here shown as the right hand end, is provided with a flange 10, defined by notches 11, which, in the finished screen, stands at right angles to the plane of the screen to form, in conjunction with a similar flange on the male member, a stop to prevent separation of the two screen members. The other or left hand end of the screen is formed with a web 12 which, in the finished screen, is bent over to enclose the wire 5. At the right hand corners of the screen members are formed guiding extensions 13.

The male member 14 is similarly formed from a blank shown in Figure 23, except that in place of the channel 8 the member is formed with inwardly turned tongues 15 which engage the channels 8 as shown in Figure 22. Attention is also directed to the tabs 16 formed at the left hand end of the female screen member by notches 17, which tabs are bent downwardly, after the screen members are assembled, so that they project within the channels and prevent separation of the screen members in the direction opposite to that in which the flanges 10 operate for the same purpose.

In describing the construction and operation of the machine, the apparatus will be considered as assembled for the manufacture of the female screen member and the changes to make it over for the manufacture of the male member will be noted.

The apparatus is supported upon a frame or standard 20 on the upper surface of which is supported the bed plate 21. At the corners of the bed plate are mounted the vertical guide posts 22 connected at their upper ends to a top plate 23. Slidably mounted on the posts 22 is a vertically movable crosshead 24, which is carried by the piston 25 operated by a cylinder 26 mounted on the top plate. Movement of the piston is controlled by the usual 4-way valve 28 operated by the hand lever 29, so that the piston may be raised or lowered as required.

To the under side of the crosshead is secured a tool carrying plate 30 to which are attached the various tools, these tools being removable so that the machine may be adapted for different sizes of screens and for the manufacture of the male screen member. Located centrally of the plate 30 is a spacer 31 and at the two ends are spacers 32 which determine the location of the tools. Arranged longitudinally of the top plate and abutting the spacers are bearing strips 34, the outer edges of which are beveled or tapered downwardly as shown in Figure 8, for example. Mounted in contact with the strips 34 are the crimping tools 35 which form the inner face of the gutter 8. Each crimping tool is provided with a beveled, inner face 36 which fits against the bevel face of the strip 34 and along the outer edges with a tongue 38 which fits between the gutter and the edge of the main screen body and over the wire 5 when the screen is formed. The tools 35 are mounted in the crosshead by means of headed bolts 39 which are suspended from fixed plates 40 arranged alongside of the plate 30. The bolts pass through slots 41 in the tools 35 and the heads of the bolts are located so that the tools have a limited movement, both vertically and laterally. It will be noted that when the crosshead reaches the lowermost point of its movement the tools 35 will be forced upwardly by contact with the blank and outwardly by the bevel surfaces, so that the tongues 38 are moved outwardly over the wires, as shown in Figure 16. When the crosshead is raised, the screen is carried upwardly by engagement of tongues under the channel, but the crimping tools move downwardly and inwardly so that the grip upon the screen is relaxed and it can be slipped off the crimping tools after the machine is opened up.

Carried by the strips 40 are pressure bars 44 which form the outer channel wall, as shown in Figure 16. Mounted on the right hand end of the plate 30 against the spacer 32 is a forming tool 46 having a vertical face which shapes the inner surface of the stop flange 10 (Figure 14).

At the left hand end of the plate 30 where the web 12 is pressed in over the wire 5, it is necessary first to force the wire into the gutter at this point and then to permit an appropriate tool on the bed plate to bend the web over the wire, so that this portion of the upper die or forming plate is constructed so that it will yield or retreat before the bending tool. This construction will now be described.

It will be noted that the strips 40, which carry the crimping tools 35, are rabbeted along their upper edges to provide guideways 48 which are utilized for the purpose of supporting, for sliding movement, a block 49 having flanges 47 received in the guideways. To the under surface of the block 49 is attached a pressure plate 50 and a tool 51 which operates to force the wire in the gutter on the completion of the downward stroke of the crosshead. Springs 52 urge the plate to the outer limit of its movement, but yield to permit the tool to move toward the center of the blank upon the forward movement of the bending tool.

As will have been understood from the description, each of the tools carried by the crosshead cooperates with a tool carried by the bed plate, which set of lower tools and operating mechanism will now be described.

Centrally located on the bed plate 21 is a platen 55, the upper surface of which is designed to support the blank and the screen cloth as it is laid over the blank. About the edge of the platen is formed a groove 56 to receive the gutter 3 on the blank, thereby not only supporting the gutter for the reception of the wire, but also locating the blank accurately in position. At the right hand corners, the platen 55 is extended to form ledges 57 on which are mounted plates 58 slightly higher than the balance of the platen to pinch the extensions 13 against the tools 35 when the crosshead is lowered, this construction preventing distortion of the tabs.

The platen is supported upon a number of coil springs 60 located at the corners of the platen so that it will yield against the downward pressure of the crosshead, being guided by pins 61 movable in vertical openings in the bed plate. The upward movement of the platen is limited by headed bolts 62, the heads of which strike against shoulders 63 formed within recesses 64 opening from the under side of the bed plate. As the crosshead approaches the bed plate, the platen will move downwardly, the edges of the blank being bent upwardly by the tools arranged about the platen, which tools subsequently shape the edges of the screen blank to their final form in cooperation with the tools on the crosshead.

For shaping the channels 8, the bed plate is provided with aligned guideways 66 in the opposite sides of the plate, in each of which is mounted a slide 67 held in place by a gib or key 68. On the upper surface of each slide is secured a tool carrying plate 70 to the forward or inner edge of which is secured a forming tool 71, the edge of which is of the same shape as the interior of the channel 8.

The tool for forming the stop flange 10 is indicated by the numeral 72 and is carried on a block 73 which is mounted on a slide 74 movable in guideways on the bed plate. This tool is provided with a shoulder 75 which will force the flange partially around the wire.

Figure 13:
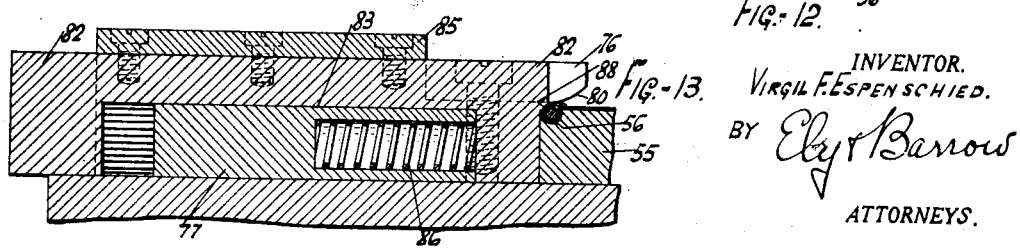
Figure 13 is an enlarged section of the left hand end of the die taken at the corner of the die.

The tool for bending the web 12 at the left hand end of the screen is designated by the numeral 76 and is carried by a block 77 mounted on the slide 78 movable in the guideways on the bed plate. The forward edge of the tool is curved upwardly slightly, as shown at 80, and is arranged to strike the tool 51 on the yielding slide 50. As the web 12 extends only in the central or midway portion of the screen, it is necessary, at the corners, to provide only for forcing the edge of the gutter about the wire. For this reason the tool 76 is flanked at either corner by yielding blocks 82 having reduced central portions which are slidably mounted in grooves 83 formed in the upper surface of the tool carrying block 77. The blocks 82 are confined in the grooves by plates 85 and are urged outwardly by coil springs 86 set in recesses in the block 77. As the slide 78 is moved forwardly the members 82 will strike the platen 55, but the tool 76 will continue, bending the web 12 downwardly as shown. The blocks 82 are provided with overhanging portions 88 which shape the corners of the blank around the wire (Figure 13).

The several slides 67, 74 and 78 are moved toward the center of the bed plate simultaneously by power operated means to be described.

Mounted in the support 20 is a bearing 90 and in a bracket 91 is an aligned bearing 92 in which bearings is mounted a power shaft 93, the inner end of which carries a crank 94. The outer end of the shaft carries a loose pulley 95 driven from any suitable source of power and adjacent to the pulley is located a clutch sleeve 96 fixed to the shaft 93. The pulley 95 and the clutch sleeve 96 are adapted to be connected for a single revolution by a clutch pin 98, the movement of which is controlled by a lever 99, the end of which lies in a groove 100 about the collar, into which groove the end of the pin will project. The lever is actuated by a spring operated foot treadle 101. The mechanism which has just been described constitutes a convenient form of one-revolution-and-stop clutch, other forms being capable of substitution therefor. The essential feature is that by depressing the treadle 101, the operator permits the machine to rotate through a complete cycle which forms a single screen member, the machine being stopped in its open position, shown in Figures 1 and 2, with the crank 94 at its high position.

The crank 94 is connected by a link 105 to a plunger 106 which is guided for vertical movement on parallel guide rods 104 depending from the bed plate 21.

The plunger is connected to links 107 extending beneath each of the slides, the links being pivoted to levers 108 which are fulcrumed at 109 to the under side of the bed plate. It will be noted that the link 107a to the slide 78 is longer and located above the other links to give the increased travel for the slide which is necessary. The upper ends of the levers project through openings 110 in the bed plate and are provided with knob-like extremities 112 which are received within apertures 114 in the several slides. The apertures are lined with wear plates 115 on the inner sides of the apertures and adjustable wear plates 116 on the outer sides of the apertures. The outer movement of the slides 67 are determined by adjustable stops 118 arranged to contact with the oblique edges 119 of the slides. The movement of the slide 74 is determined by adjustable stops 120 contacting with shoulders 121 on the block 73. The movement of the slide 78 is determined by an adjustable stop 122 mounted in a bracket 123 secured to the side of the bed plate 21.

For forming the male screen member, the tools at the ends of the screen are not altered, tools along the sides of the screen being changed as shown in Figure 17. In place of the crimping tool 35, a tool 125 is substituted having a tongue 126 along its outer edge which corresponds to the tongue 15, the method of securing the tool to the tool carrying plate being the same. The strip or tool 44 is removed. In place of the tool 71, a tool 128 is mounted on the tool carrying plate 70, this tool conforming to the outer surface of the flange 15.

Figure 2:
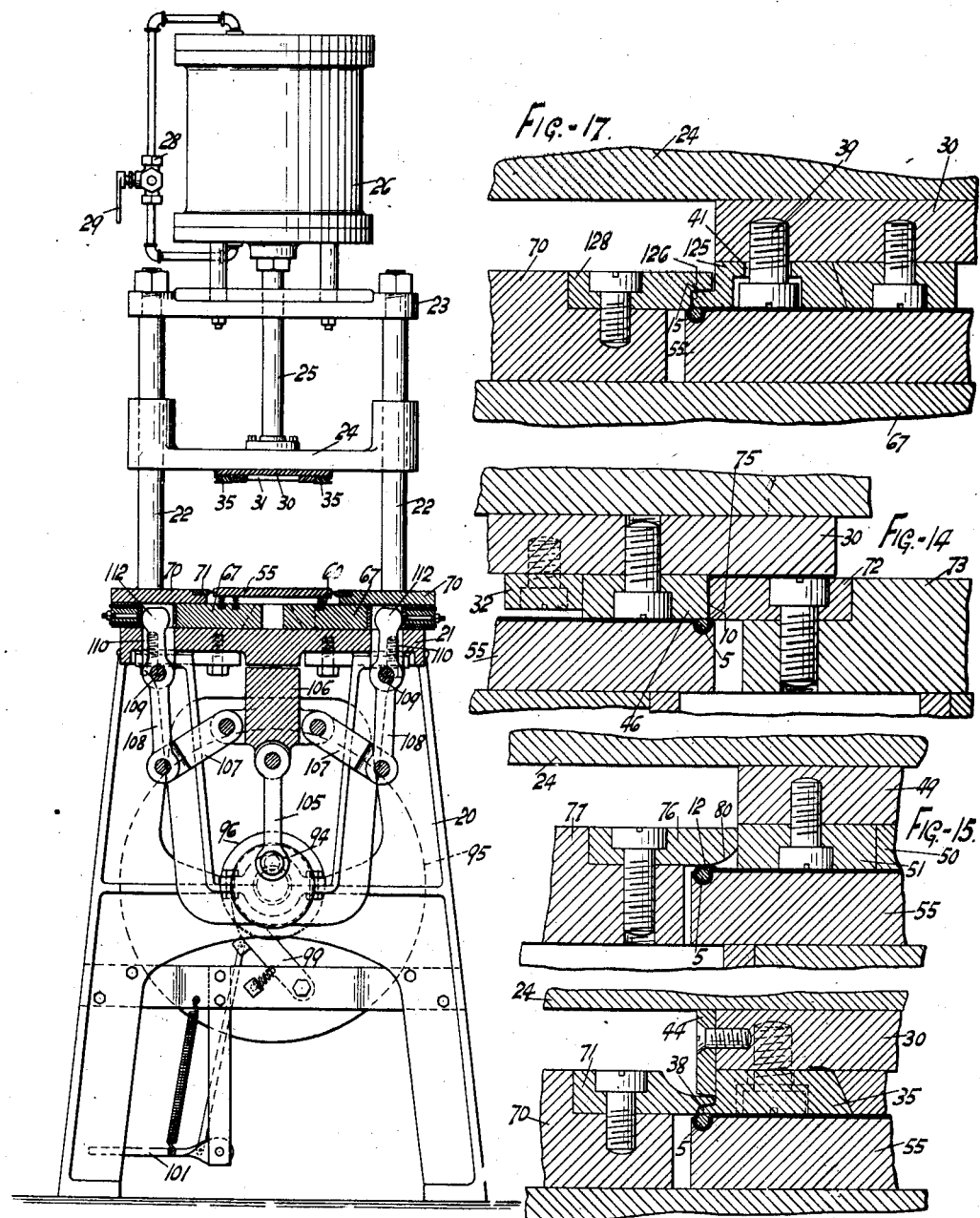
Figure 2 is a side elevation, partly in section.

The operation of the machine may be briefly described as follows:

The proper tools having been mounted on the machine, either for the manufacture of the male or female screen member, and the machine being open, as shown in Figures 1 and 2, the operator places the blank in the machine upon the platen 55, the gutter being seated within the groove 56. The screen cloth, either fabric or woven wire, is placed over the blank and the wire 5 laid over the gutter, being pressed slightly within the gutter so as to insure proper positioning. The valve 29 is now operated to bring the crosshead down upon the screen, the several tools bearing upon the upper surface of the wire and forcing the wires in the gutter, which operation stretches and tensions the screen across the blank. As the crosshead reaches the lower limit of its movement, the edges of the blanks are turned up to start the folding operation and the tools 35 (or 125) are forced outwardly to the position shown in Figure 16.

Figure 3:
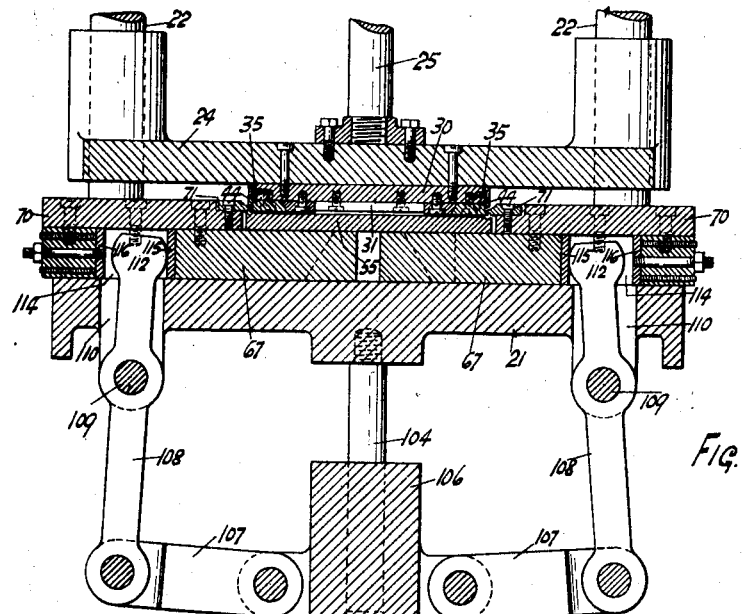
Figure 3 is an enlarged section of the machine with the dies brought together, or in operative position, the view being taken transversely or across the screen.
Figure 4:
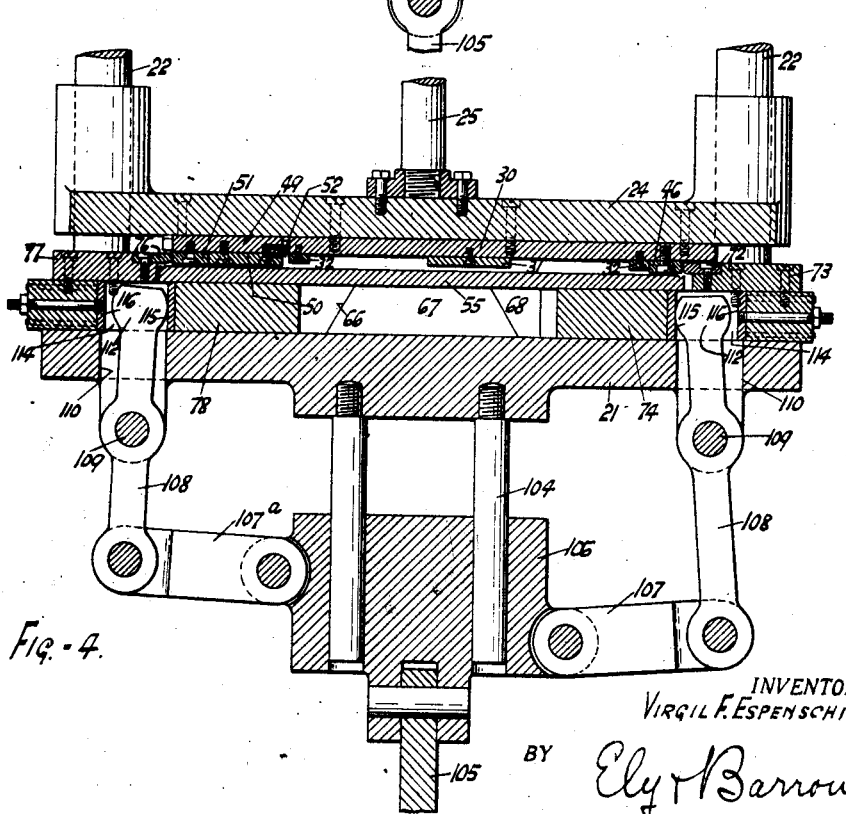
Figure 4 is a similar view taken at right angles to Figure 3 or longitudinally of the screen.
Figure 5:
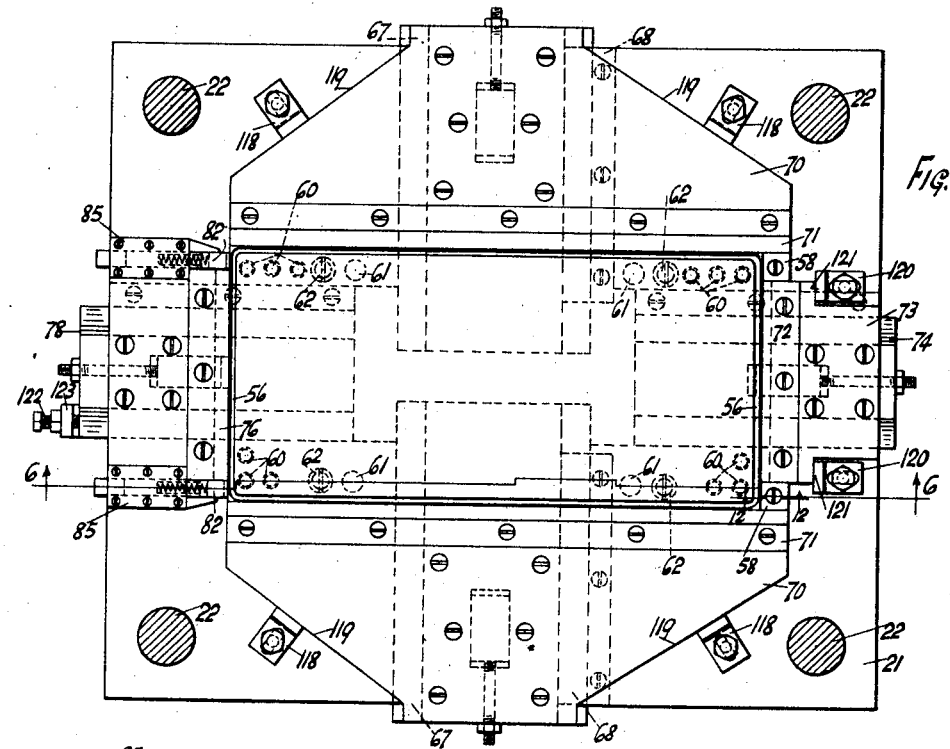
Figure 5 is a plan view of the table or lower die, the view being taken on the line 5—5 of Figure 1.
Figure 6:
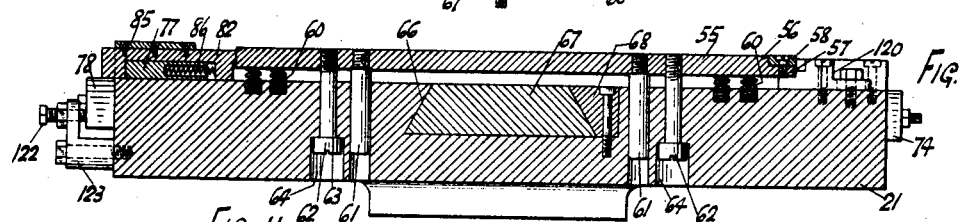
Figure 6 is a cross-section on the line 6—6 of Figure 5.
Figures 11, 12:
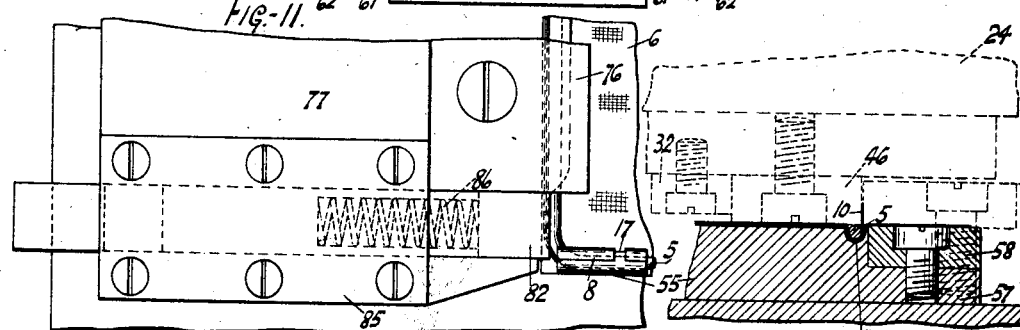
Figure 11 is an enlarged detail at the corner of the screen member.
Figure 12 is an enlarged section at a corner on the right hand end of the die, the top plate being dotted, the section being taken on the line 12—12 of Figure 5.

With the crosshead at its lowermost position, the operator steps upon the treadle 101 and engages the clutch for a single revolution. This will move the plunger 106 downwardly, as shown in Figure 3, whereupon the tools 71 will move inwardly forcing the side edges of the blank between the crimping tool 35 and the side tools 44 (or forcing the tool 128 against the tool 125).

At the same time the tool 72 will be moved inwardly forcing the flange 10 against the tool 46 (Figure 14). The tool carrier 77 will, at the same time, be moved inwardly, the tool 76 forcing the web 12 over the wire, the tool 51 receding before the tool 76. The blocks 82 will form the corners of the blank around the wire, but will stop when striking the platen.

When the plunger 106 reaches the upper limit of its movement, the tools on the bed plate are withdrawn and the operator moves the crosshead upwardly, the finished screen member being carried upwardly by the crosshead as it is supported by the edges of the side forming tools. As the side forming tools leave the platen they will drop slightly as permitted by the bolts 39 and move inwardly, releasing the grip upon the screen member and permitting it to be drawn endwise off the tools.

It will be observed that the machine is adapted to manufacture from a suitable blank, the entire screen member, including the operation of securing the screen cloth in position by forcing the wires into the gutters. The tools both secure the wire in place and form the mating sliding formations and the stop flanges. After two screen members are assembled, the tabs 16 are pressed inwardly, locking the screens together.

While the description has been quite specific, it is obvious that changes and modifications may be resorted to and that exact conformity with the details is not essential to the practice of the invention. As far as is known, the machine here shown is the first to manufacture a complete screen, and, as such, is entitled to a liberal construction of the attached claims.

What is claimed is:

1. In a machine for the manufacture of a screen, the combination of a platen adapted to receive a blank, a pressure means for forcing a fabric retaining wire into the blank, and tools operative to force the metal of the blank about the wire after the wire is seated in the gutter around the entire periphery of the blank.

2. In a machine for the manufacture of a screen having a gutter in which the screen fabric is clamped by a retaining wire, a platen having a groove about its periphery to receive the gutter, a plate above the platen and movable toward the platen having a surface thereon adapted to bear against the wire and force it into the gutter, and tools movable toward the platen to force the edges of the blank about the wire around the periphery of the blank while the plate is in contact with the wire.

3. In a machine for the manufacture of a screen having a gutter in which the screen fabric is clamped by a retaining wire, a platen having a groove about its periphery to receive the gutter, a plate above the platen and movable toward the platen having a surface thereon adapted to bear against the wire and force it into the gutter, and tools movable toward the platen to force the edges of the blank about the wire around the periphery of the blank while the plate is in contact with the wire and adapted at the same time to form a sliding formation along the sides of the blank.

4. In a machine for the manufacture of a screen member having mating sliding formations along the sides thereof and a screen cloth secured by a retaining wire seated in a gutter in the member, the combination of a platen for supporting the screen member, pressure members for forcing the wire in the gutter, and tools movable toward and from the edges of the blank for forming the sliding formations against the pressure members.

5. In a machine for the manufacture of a screen member as shown and described, a platen for supporting a blank, screen fabric and a retaining wire, a plate movable toward and from the platen, tools upon the plate adapted to bear upon the wire and force it into the blank, the sides of the tools being formed to correspond to sliding formations upon the edges of the screen member, and tools movable toward the platen and having surfaces corresponding to the surfaces of tools upon the plate.

6. In a machine for the manufacture of a screen member as shown and described, a platen for supporting a blank, screen fabric and a retaining wire, a plate movable toward and from the platen, tools upon the plate adapted to bear upon the wire and force it into the blank, the sides of the tools being formed to correspond to sliding formations upon the edges of the screen member, and tools movable toward the platen and having surfaces corresponding to the surfaces of tools upon the plate and having edges which force the blank around the wire.

7. In a machine for the manufacture of a screen member as shown and described, a platen for supporting a blank, screen fabric and a retaining wire, a plate movable toward and from the platen, tools upon the plate adapted to bear upon the wire and force it into the blank, the sides of the tools being formed to correspond to sliding formations upon the edges of the screen member, tools movable toward the platen and having surfaces corresponding to the surfaces of tools upon the plate, and a tool to bend one end of the blank into an angle to the plane of the screen.

8. In a machine for the manufacture of a screen member as shown and described, a platen for supporting a blank, screen fabric and a retaining wire, a plate movable toward and from the platen, tools upon the plate adapted to bear upon the wire and force it into the blank, the sides of the tools being formed to correspond to sliding formations upon the edges of the screen member, tools movable toward the platen and having surfaces corresponding to the surfaces of tools upon the plate, a tool to bend one end of the blank into an angle to the plane of the screen, and a tool to bend the other end of the blank completely around the wire.

9. In a machine for the manufacture of a screen member as shown and described, a platen for supporting a blank, screen fabric and a retaining wire, a plate movable toward and from the platen, tools upon the plate adapted to bear upon the wire and force it into the blank, the sides of the tools being formed to correspond to sliding formations upon the edges of the screen member, tools movable toward the platen and having surfaces corresponding to the surfaces of tools upon the plate, and a tool to bend the other end of the blank around the wire.

10. In a machine for the manufacture of a screen member as shown and described, a yielding platen to receive a blank, tools surrounding the platen, means to press the platen downwardly between the tools, and means to move the tools inwardly over the depressed platen to form the sides of the blank into mating sliding formations.

11. In a machine for the manufacture of a screen member from a blank, the screen having sliding formations along the sides thereof, a yielding platen, tools on the sides of the platen, a crosshead movable toward and from the platen, tools carried by the crosshead and adapted to bear upon the sides of the screen blank, and means to move the first named tools toward the last named tools after the crosshead is moved toward the platen, the said tools forming the sliding formations upon the screen blank.

12. In a machine for the manufacture of a screen member from a blank, the screen member having sliding formations along the sides thereof, a crosshead movable toward and from the blank, tools carried by the crosshead, said tools having reduced extensions along their lower edges adapted to define the sliding formations, a platen to support the blank and having a gutter therein underlying the tool, and cooperating tools adapted to form the blank into sliding formations about the first named tools.

13. In a machine for the manufacture of a screen member from a blank, the screen member having sliding formations along the sides thereof, a crosshead movable toward and from the blank, tools carried by the crosshead, said tools having tongues along their edges, means to force the sides of the blanks around the tongues, a tool also carried by the crosshead having a vertical outer face, and means to force one end of the blank against the tool.

14. In a machine for the manufacture of a screen member from a blank, the screen member having sliding formations along the sides thereof, a crosshead movable toward and from the blank, tools carried by the crosshead, said tools having tongues along their edges, means to force the sides of the blanks around the tongues, a tool also carried by the crosshead having a vertical outer face, means to force one end of the blank against the tool, a yieldingly mounted tool at the other end of the blank, and a tool movable across the end of the blank and operating to move the yieldingly mounted tool toward the center of the blank.

15. In a machine for the manufacture of a screen member from a blank, a crosshead, a platen below the crosshead, means for operating the crosshead toward and from the platen, tools mounted on the crosshead having outwardly projecting tongues along their edges, means to form the sides of the blank about the tongues, and a supporting means for the tools which permits a limited movement thereof when the crosshead is elevated above the platen.

16. In a machine for the manufacture of a screen member from a blank, a crosshead, bolts upon the crosshead, tools having transverse slots received over the bolts, tongues along their outer edges and beveled inner edges, beveled formations on the crosshead against which the beveled edges of the tools are adapted to bear, and means for forming the blank about the tongues.

17. In a machine for the manufacture of a metal wire screen, the combination of a platen having a groove therein to receive a gutter on a screen blank and a screen retaining wire, a pressure plate movable against the platen to force the wire into the gutter, and a bending tool movable across the gutter after the plate has completed its operation.

18. In a machine for the manufacture of a metal wire screen, the combination of a platen having a groove therein to receive a gutter on a screen blank and a screen retaining wire, a pressure plate movable against the platen to force the wire into the gutter, and a bending tool movable across the gutter, the plate being mounted to recede before the bending tool.

19. A machine for the manufacture of a rectangular screen member, comprising a platen to support a blank, a die member movable to compress the blank against the platen, and four forming tools movable toward the platen from the four sides to shape the edges of the blank against the die.

20. A machine for the manufacture of a rectangular screen member, comprising a platen to support a blank, a die member movable to compress the blank against the platen, and four forming tools movable simultaneously toward the platen from the four sides to shape the edges of the blank against the die, three of the said tools forming the edges of the blank at angles to the plane of the screen.

21. A machine for the manufacture of a rectangular screen member, comprising a platen to support a blank, a die member movable to compress the blank against the platen, and four forming tools movable simultaneously toward the platen from the four sides to shape the edges of the blank against the die, three of the said tools forming the edges of the blank at angles to the plane of the screen, the fourth bending the edge of the blank upon itself.

22. A machine for the manufacture of a rectangular screen member, comprising a platen to support a blank, a die member movable to compress the blank against the platen and embed a retaining wire in the blank, and four forming tools movable toward the platen from the four sides to shape the edges of the blank against the die.

23. A machine for the manufacture of a rectangular screen member, comprising a platen to support a blank, a die member movable to compress the blank against the platen and embed a retaining wire in the blank, and four forming tools movable simultaneously toward the platen from the four sides to shape the edges of the blank against the die, three of the said tools forming the edges of the blank at angles to the plane of the screen.

24. A machine for the manufacture of a rectangular screen member, comprising a platen to support a blank, a die member movable to compress the blank aganst the platen and embed a retaining wire in the blank, and four forming tools movable simultaneously toward the platen from the four sides to shape the edges of the blank against the die, three of the said tools forming the edges of the blank at angles to the plane of the screen, the fourth bending the edge of the blank upon itself.

VIRGIL F. ESPENSCHIED.